United States Patent [19]

Schaeffer et al.

[11] Patent Number: 5,780,110
[45] Date of Patent: Jul. 14, 1998

[54] METHOD FOR MANUFACTURING THERMAL BARRIER COATED ARTICLES

[75] Inventors: Jon C. Schaeffer, Milford, Ohio; William B. Connor, Clifton Park, N.Y.; Robert D. Field, Los Alamos, N. Mex.

[73] Assignee: General Electric Company, Cincinnati, Ohio

[21] Appl. No.: 819,344

[22] Filed: Mar. 18, 1997

Related U.S. Application Data

[62] Division of Ser. No. 577,169, Dec. 22, 1995, abandoned.

[51] Int. Cl.⁶ .................. B05D 3/00; C23C 14/00
[52] U.S. Cl. .............. 427/327; 427/337; 427/528; 427/531; 427/250; 427/405; 427/255.7
[58] Field of Search ................... 427/327, 337, 427/405, 404, 250, 419.2, 528, 531, 255.7; 428/632, 678; 204/192.15

[56] References Cited

U.S. PATENT DOCUMENTS

| | | | |
|---|---|---|---|
| 4,055,705 | 10/1977 | Stecura et al. | 428/633 |
| 4,095,003 | 6/1978 | Weatherly et al. | 427/34 |
| 4,321,310 | 3/1982 | Ulion et al. | 428/612 |
| 4,321,311 | 3/1982 | Strangman | 425/623 |
| 4,335,190 | 6/1982 | Bill et al. | 428/623 |
| 4,401,697 | 8/1983 | Strangman | 427/250 |
| 4,485,151 | 11/1984 | Stecura | 428/633 |
| 4,490,191 | 12/1984 | Hale | 148/31.5 |
| 4,851,300 | 7/1989 | Przbyszewski | 428/623 |
| 4,880,614 | 11/1989 | Strangman et al. | 428/623 |
| 4,900,640 | 2/1990 | Bell et al. | 428/633 |
| 4,916,022 | 4/1990 | Solfest et al. | 428/623 |
| 4,966,820 | 10/1990 | Kojima et al. | 428/622 |
| 5,238,752 | 8/1993 | Duderstadt et al. | 428/623 |
| 5,302,465 | 4/1994 | Miller et al. | 428/552 |
| 5,403,669 | 4/1995 | Gupta et al. | 428/550 |
| 5,512,382 | 4/1996 | Strangman | 428/632 |
| 5,514,482 | 5/1996 | Strangman | 428/623 |
| 5,645,893 | 7/1997 | Rickerby et al. | 427/405 |

FOREIGN PATENT DOCUMENTS

| | | |
|---|---|---|
| 0 236 520 | 9/1987 | European Pat. Off. . |
| 0 340 791 | 11/1989 | European Pat. Off. . |
| 0 567 252 A1 | 10/1993 | European Pat. Off. . |
| 0 733 723 A1 | 9/1996 | European Pat. Off. . |
| 2159838 | 12/1985 | United Kingdom . |
| 93/18199 | 9/1993 | WIPO . |

*Primary Examiner*—Roy V. King
*Attorney, Agent, or Firm*—Andrew C. Hess; David L. Narciso

[57] ABSTRACT

A method for manufacturing an article for use in a gas tubine engine is disclosed, which comprises applying a metallic bond coating on a superalloy substrate; surface doping a surface of the bond coating with at least one element selected from the group consisting of Fe, Cr and Y by plating, ion implantation, MOCVD and sputttering; and then applying an insulative ceramic coating on the bond coating.

4 Claims, 1 Drawing Sheet

METHOD FOR MANUFACTURING THERMAL BARRIER COATED ARTICLES

This application is a division, of application Ser. No. 08/577,169, filed Dec. 22, 1995 now abandoned.

BACKGROUND OF THE INVENTION

1. Field of the Invention

This invention relates generally to ceramic coating systems for metal substrates and more specifically to protective, multi-layer, ceramic thermal barrier coating systems for metallic components of gas turbine engines, such as superalloy blades and vanes.

2. Description of the Related Art

As is well known, the power and efficiency of gas turbine engines typically increases with increasing nominal operating temperature, but the ability of the turbine to operate at increasingly higher temperatures is limited by the ability of the turbine components, especially the vanes and blades, to withstand the heat, oxidation and corrosion effects of the impinging hot gas stream and still maintain sufficient mechanical strength. Thus, there exists a continuing need to find advanced material systems for use in components that will function satisfactorily in high performance gas turbines, which operate at higher temperatures and stresses.

One approach to providing improved turbine components is to fabricate a strong, stable substrate having the shape of the component, and cover the substrate with a thin protective coating that resists the oxidation and corrosion effects of the hot combustion gas stream. The underlying substrates, usually nickel-base or cobalt-base superalloy compositions, were at one time formed by common forging or simple casting procedures but now improved performance results from use of cooled airfoils made by directional solidification. Even greater operating temperatures are possible by casting the substrate as a single crystal having no grain boundaries which might cause premature failure, and with the single crystal orientation selected to meet required creep-rupture and fatigue lives.

Insulative ceramic coatings further enhance turbine performance by reducing heat transferred into cooled airfoils, reducing the requirement for cooling air, which is a performance penalty. Durability of turbine components is also enhanced by ceramic coatings that minimize metal temperatures and thermal stresses in the superalloy component.

A modern ceramic coating system typically has several layers of differing compositions, and properties, in order to provide the best combination of benefits. For example, one layer may be relatively thick and porous to provide an insulative effect but, by itself, offering little resistance to oxidation, erosion, or corrosion. The outer surface of such a layer may be protected from erosion by providing a thin, hard, dense surface layer.

Generally, a thin metallic layer or bond coating is applied under the ceramic to protect the substrate through formation of an adherent oxide scale, such as aluminum oxide, which resists the oxidizing effects of the hot combustion gas stream. Other elements present in the coating contribute to the ability of the protective ceramic coating to adhere to the substrate through many cycles of gas turbine startup and shut down.

Lives of ceramic coatings are limited at high temperatures due to excessive growth of the oxide scale on the bond coating and flaws which develop within the interfacial zone between the metallic bond coating and insulative ceramic layer. Thermally induced deterioration of the interfacial zone coupled with thermal transient, and ceramic-superalloy thermal expansion mismatch, stresses eventually lead to spalling of the insulative layer.

It should be apparent from the foregoing general discussion of the art, that further improvements, in both the effectiveness and useful life, of coating systems are required in order to survive the increasingly severe operating conditions in high performance gas turbine engines.

There is therefore a general desire to provide a new and improved method for enhancing ceramic based coating system for use on gas turbine engine components by enhancing the adherence of the thermal barrier coating to the bond coat.

Accordingly, it is an object of this invention is to provide improved methods of applying ceramic coatings to metallic substrates. The degree of adhesion of thermal barrier coats to bond coats is a major barrier to the increased use of the technology in high temperature environments.

SUMMARY OF THE INVENTION

A coating system, coated article and method are provided which yield a thermal barrier coating having good adhesion to a bond coat overlying a metal superalloy substrate. The adhesion of the bond coat and the thermal barrier coating (TBC) is achieved by formation of a mature $\alpha$-$Al_2O_3$ (rhombohedral) scale at the bond coat/TBC interface. The adhesion of the thermal barrier coating to the bond coat is enhanced by utilizing one or more of the following steps (1) preoxidation of the bond coat, (2) inoculation of the surface of the bond coat, (3) surface doping (or alloying) of the bond coat surface, and (4) the addition of noble metals. Each of the above steps improves the formation of $\alpha$-$Al_2O_3$ which improves the adhesion of the TBC to the bond coat by avoiding undesired oxide phase transformations.

DETAILED DESCRIPTION OF THE INVENTION

Figure 1:
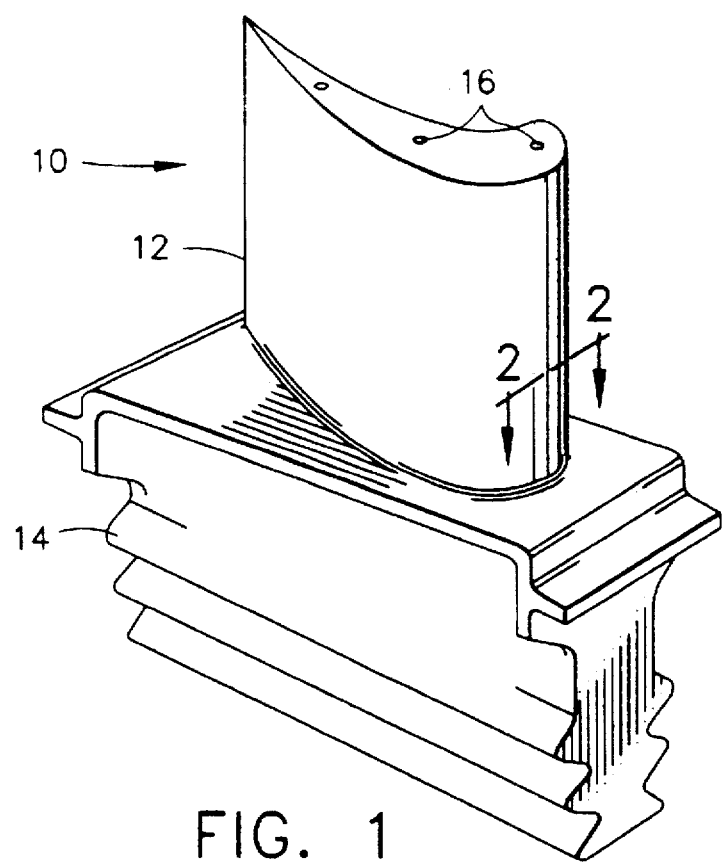
FIG. 1 is a perspective view of a turbine blade having a coating according to the present invention.

As previously described a metal substrate, such as a turbine blade, is covered with a metallic bond coating. The metal substrate is preferably a nickel-base or a cobalt-base superalloy. However, dispersion-strengthened alloys, composites, and directional eutectics may be protected in accordance with the invention.

The metallic bond coating of NiCrAlY or CoCrAlY is preferably deposited on the surface of the substrate by plasma spraying as described in U.S. Pat. No. 4,055,705 which is incorporated herein by reference. However, it is contemplated that cladding, slurry spray, and sintering may be used for applying the metallic bond coating to the substrate. A bond coating of NiCrAlY having a thickness between about 0.003 inches and 0.007 inches has given satisfactory results. The metal bond coating may be a platinum aluminide or diffusion aluminide applied or deposited by CVD or pack cementation as set out, for example, in Bungardt et al., U.S. Pat. No. 3,677,789, which is incorporated herein by reference. A bond coating of platinum aluminide preferably has a thickness of from 0.001 to 0.004 inches.

The thermal barrier coating is preferably a yttria stabilized zirconia. Thermal barrier coatings are set out in Kojima et al., U.S. Pat. No. 4,966,820, issued Oct. 30, 1990, which is incorporated herein by reference. The thermal barrier coating may be applied by thermal spray or electron beam physical vapor deposition (EBPVD). Sputter deposition of yttria stabilized zirconia may be performed using a 10 cm diameter argon ion beam from an electron bombardment ion source of the type developed from electric propulsion technology. Such an ion source is described in "Advanced in Electronics and Electron Physics" by H.R. Kaufman, vol. 36, pages 365–373. Beam extraction may be accomplished by a dished, two-grid ion optics system. Such a system is described in AIAA Paper No. 76–1017 entitled "A 30 cm Diameter Argon Ion Source". Neutralization of the ion beam can be achieved by using a plasma bridge neutralizer. Suitable thermal barrier coatings include ceramics containing $ZrO_2$ as a main component and $Y_2O_3$ (for example, 4 to 20 wt. %), MgO (for example, 4 to 24 wt. %) or CaO (for example, 4 to 8 wt. %) as a minor component. A typical yttria stabilized zirconia contains 6 to 30 weight percent yttria based on the total weight of zirconia and yttria, more preferably 6 to 20 weight percent yttria, and most preferably from 6 to 10 weight percent yttria. The thickness of the thermal barrier layer may be selected from 1 to 1000 microns, and is preferably selected from 50 to 300 microns. Suitable thermal barrier coatings are set out in Strangman et al., U.S. Pat. No. 4,880,614, issued Nov. 14, 1989, which is incorporated herein by reference.

The bond coating comprises a metallic layer of MCrAlY alloy, a continuous adherent alumina layer (formed in situ) on the metallic layer and a discontinuous pure ceramic layer of a particular columnar or lamellar morphology on the alumina layer.

The metallic layer is comprised of a MCrAlY alloy which has a broad composition of 10 to 30% chromium, 5 to 15% aluminum, 0.01 to 1% yttrium (or hafnium lanthanum, cerium and scandium) and M, being the balance, being selected from the group consisting of iron, cobalt, nickel and mixtures thereof. Minor amounts of other elements may also be present. Such alloys are known in the prior art for use alone as a protective coating and are described in various U.S. Pat. Nos. including 3,542,530; 3,676,085; 3,754,903 and 3,928,026 which are incorporated herein by reference. Also suitable is platinum aluminide layers such as disclosed in U.S. Patent to Bungardt, U.S. Pat. No. 3,677,789, which is incorporated herein by reference.

The thermal barrier coatings are suitable for various metal or ceramic substrates. The thermal barrier coating is preferably applied as an overlay coating to the bond coating which is applied to and overlays a superalloy substrate in any of a variety of applications to nickel-base superalloy substrate based components. One such application is a thermal barrier coating on a jet engine gas turbine blade (10) (component; article) as illustrated in FIG. 1. The substrate of the blade (10) may be formed of any suitable superalloy. One example of such a superalloy is Rene'80, a well known nickel-base superalloy which has a nominal composition, in weight percent, of 14 percent chromium, 9.5 percent cobalt, 5 percent titanium, 4 percent tungsten, 4 percent molybdenum, 3 percent aluminum, 0.17 percent carbon, 0.06 percent zirconium, 0.015 percent boron, and the balance nickel. Another example is a more advanced nickel-base superalloy such as Rene' N4, having a composition, in weight percent, of 7.5 cobalt, 9.0 chromium, 3.7 aluminum, 4.2 titanium, 1.5 percent molybdenum, 4.0 percent tantalum, 6.0 percent tungsten, 0.5 percent columbium, and balance nickel. These substrate superalloys are presented as examples, and the coatings are not limited for use with these substrates. A preferred material is Rene N5 which is a well known commercially available alloy.

Suitable nickel base superalloys necessarily contain, by weight, 40 to 80% nickel, 5 to 20% chromium, and may contain up to 10% molybdenum, up to 5.5% titanium, up to 6.5% aluminum, up to 3% columbium, up to 9% tantalum, up to 13.5% tungsten, up to 2% hafnium, up to 6% rhenium, up to 20% cobalt, and up to 3% iron. The nickel based alloys may also contain minor amounts of carbon, boron, zirconium, silicon and manganese. They are also likely to contain small amounts of undesirable impurities of sulfur, copper and phosphorus.

Preferred alloys for use as the base of core of composite articles in accordance with this invention are selected from the so-called cobalt base superalloys. These alloys necessarily contain, by weight, 50 to 75% cobalt, 20 to 30% chromium, up to about 10 ½% nickel, and up to 10% or 11% tungsten. They usually contain small amounts, less than 1% by weight, of carbon, manganese and silicon. They often contain up to about 6% or 7% by weight total of one or more of titanium, boron, silicon, iron, tantalum and columbium. They may also contain small amounts of impurities of sulfur, copper or phosphorus. Specific examples of suitable substrates are set out in Shockley et al., U.S. Pat. No. 3,955,935, which is incorporated herein by reference.

As set out above, the coated article (blade) (10) has (a) a substrate (22), (b) a thermal barrier coating (26) on the substrate (22) and (c) a bonding coat (24) present between the substrate (22) and the thermal barrier coating (26).

Figure 2:
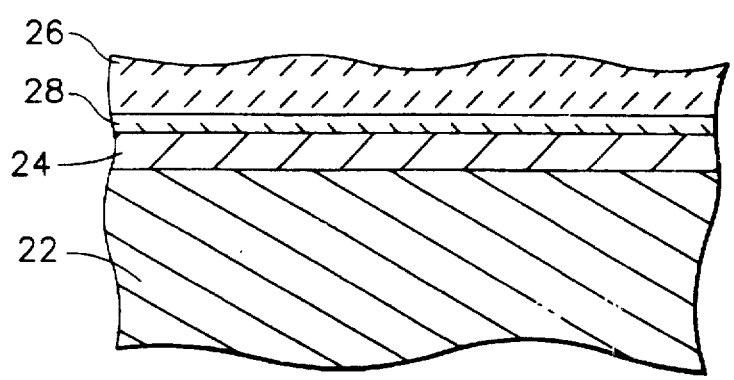
FIG. 2 is a cross-sectional view of the airfoil of FIG. 1 taken along line 2—2.

As shown in FIG. 2, the coated article comprises (a) a superalloy substrate (22), (b) a bond coat (24), (c) an $\alpha$-$Al_2O_3$ interface layer (28) and (d) a thermal barrier coating (26). Preferably the superalloy substrate has a thickness of >20 mils, the bond coat has a thickness of from 2 to 4 mils, the interface has a thickness of from 0.01 to 0.25 mils, and the thermal barrier coating has a thickness of from 5 to 15 mils.

The adhesion promoting method involves employing one or more of the following steps to form a mature $\alpha$-$Al_2O_3$ (rhombohedral) scale at the bond coat/TBC interface to enhance adhesion therebetween. The steps are (1) preoxidation, (b) inoculation, (c) surface doping or alloying and (d) noble metals.

1) Preoxidation: The preoxidation of the bond coat should occur before the deposition of the TBC. The preoxidation should occur at temperatures above 1000° C. for times greater than 1 Hr. in oxygen rich environments without thermal cycling. Thermal cycling results in the spallation of the bond coat oxide. Reduced pressure environments (vacuum) aren't necessary. There might be an advantage to preoxidation at high total pressure (autoclave). This operation may heal cracks and pores in the bond coat and thermodynamically stabilize the low atomic volume $\alpha$-$Al_2O_3$ phase.

2) Inoculation: Placing (by slurry, internal oxidation, metallo organic chemical vapor deposition, EBPVD) a sub-micron dispersion of oxide particles on the surface could inoculate the bond coat oxide. The submicron oxides would act as nucleation sites thus reducing kinetic barriers to the formation as $\alpha$-$Al_2O_3$. Oxides with the same crystal structure of $\alpha$-$Al_2O_3$ would be most effective and examples are: $\alpha$-$Al_2O_3$, $\alpha$-$Fe_2O_3$, $Y_2O_3$ and $Cr_2O_3$.

3) Surface Doping: Elements that oxidize at a faster rate than Al could be added to the surface of the bond coat (such as thin plating, ion implantation, or sputtering) in order to form oxides with the same crystal structure as $\alpha$-Al$_2$O$_3$. These elements would include but not be limited to Fe, Cr, and Y.

4) Noble Metals: The reduction in the amount of oxide other than Al$_2$O$_3$ that forms (examples include NiO and Cr$_2$O$_3$) would cause a faster transition to $\alpha$-Al$_2$O$_3$ formation. Metals that do not form stable solid oxides would accomplish this feat.

These steps improve $\alpha$-Al$_2$O$_3$ formation which improves the adhesion of the TBC to the bond coating by avoiding oxide phase transformations.

We claim:

1. A method for manufacturing an article suitable for use in a gas turbine engine, the method comprising:

(a) providing a superalloy substrate, (b) applying a metallic bond coating on the substrate, (c) surface doping a surface of the bond coating with at least one element that oxidizes at a faster rate than Al, the at least one element being selected from the group consisting of Fe, Cr and Y and (d) applying an insulative ceramic coating onto the bond coating.

2. The method of claim 1 wherein the surface doping is performed by a process selected from the group consisting of plating, ion implantation, metallo organic chemical vapor deposition and sputtering.

3. The method of claim 1 wherein the bond coating is selected from the group consisting of (i) an aluminided MCrAlY wherein M is selected from the group consisting of Ni, Co and Fe, (ii) MCrAlY wherein M is selected from the group consisting of Ni, Co and Fe, (iii) a diffusion aluminide and (iv) a platinum modified diffusion aluminide.

4. The method of claim 1 wherein the ceramic coating is Y$_2$O$_3$ stabilized ZrO$_2$.

* * * * *